Feb. 8, 1949. J. MacR. NEWMAN 2,460,901
VEGETABLE AND FRUIT SHREDDING DEVICES
Filed March 26, 1946 2 Sheets-Sheet 1
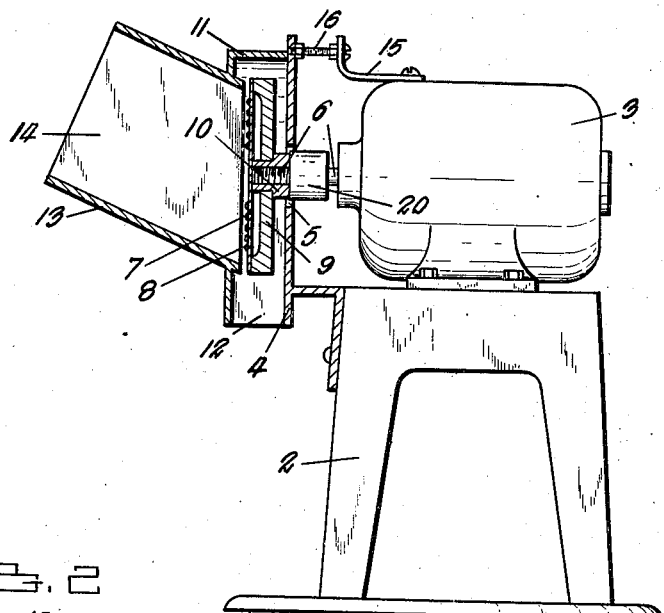
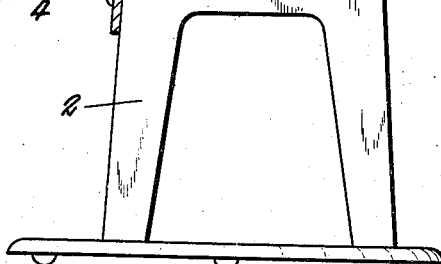
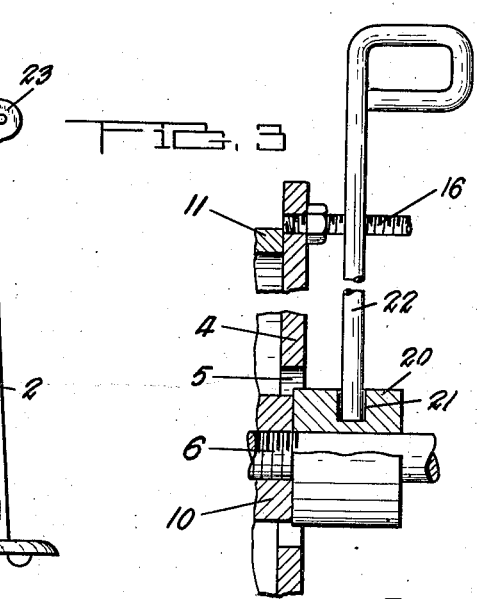
Inventor
JOSEPH M. NEWMAN
By
Attorney Feb. 8, 1949.　　　　J. MacR. NEWMAN　　　　2,460,901
VEGETABLE AND FRUIT SHREDDING DEVICES
Filed March 26, 1946　　　　　　　　　　2 Sheets-Sheet 2
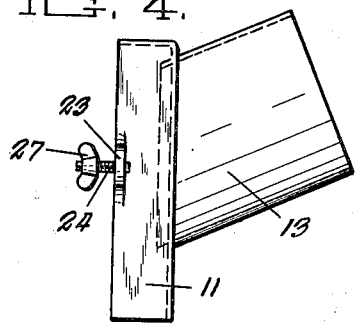
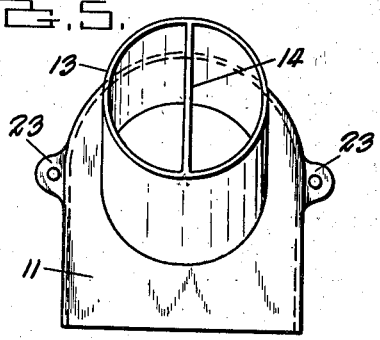
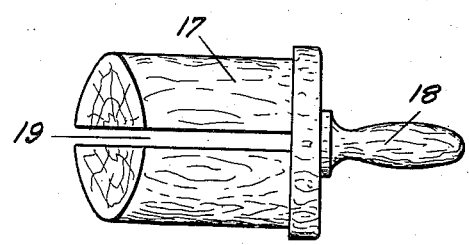
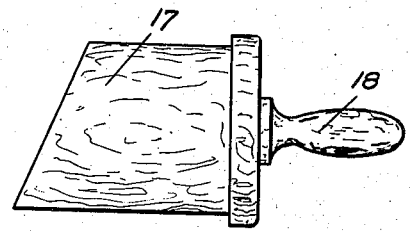
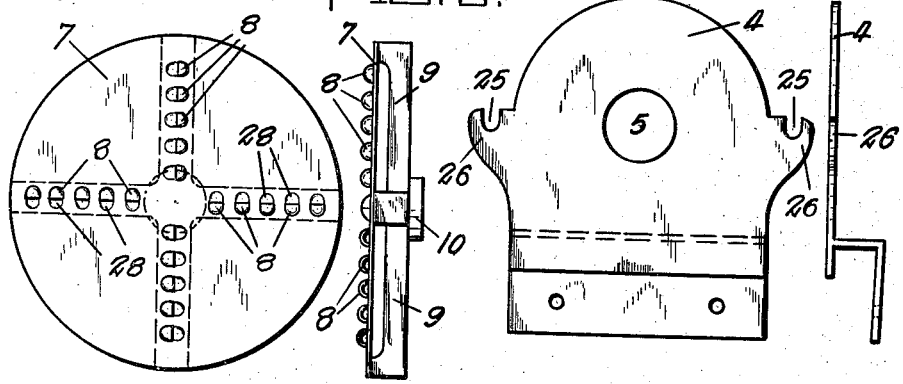
Inventor
JOSEPH M. NEWMAN
By
Attorney Patented Feb. 8, 1949

2,460,901

UNITED STATES PATENT OFFICE 2,460,901

VEGETABLE AND FRUIT SHREDDING DEVICE

Joseph MacRae Newman, Toronto, Ontario, Canada

Application March 26, 1946, Serial No. 657,250

1 Claim. (Cl. 146—177)

My invention relates to improvements in vegetable and fruit shredding devices and an object of my invention is to produce a device which will efficiently and quickly shred the vegetables or fruit being processed.

A further object of my invention is to provide a toothed disc revolving about a horizontal axis and against which the fruits or vegetables are pressed for shredding, and also to provide, in combination therewith, a means for preventing rotation of the vegetables or fruit undergoing the shredding process.

A still further object of my invention is to provide an adjustment whereby the clearance between the food feeding tube and the teeth of the shredding disc can be finely adjusted to ensure maximum efficiency.

With the foregoing and other objects in view as shall hereinafter appear, my invention consists of a device as described and illustrated in the accompanying drawings in which—

Figure 1 is a side elevational view of my device.

Figure 2 is a front elevational view of my device.

Figure 3 is an enlarged view, partially in section, of motor shaft locking means.

Figure 4 is a side elevational view of the detachable shredder housing.

Figure 5 is a front elevational view of the housing.

Figure 6 is a plan view of the feeding plunger.

Figure 7 is a side elevational view of the feeding plunger.

Figure 8 is a front elevational view of the shredding disc.

Figure 9 is a side elevational view of the shredding disc.

Figure 10 is a front elevational view of the housing supporting plate, showing it detached from the motor supporting frame, and Figure 11 is a side elevational view of the housing supporting plate as shown in Figure 10.

Like characters of reference indicate corresponding parts in the different views of the drawings.

My device comprises a suitable stand 2 having an electric motor 3 mounted on the top thereof. A plate 4 is secured to the stand 2 in front of the motor 3 and has an orifice 5 in alignment with the shaft 6 of the motor. The shaft 6 is threaded at its outer end and protrudes through the orifice 5 in the plate 4 to carry a shredding disc 7.

The shredding disc 7 comprises a metal face plate provided with a number of extruded teeth 8, arranged in rows extending radially from the disc center. The disc is secured to a spider comprising a plurality of arms 9 extending radially from a threaded hub 10 within which the end of the shaft 6 is threaded.

The outer face of the plate 4 supports a housing 11 within which the disc 7 is contained. The housing is open at its bottom to provide a discharge orifice 12 beneath the disc. The housing 11 is formed with a feeding tube 13 which is open at both ends and provided with a centrally located web 14. The feeding tube extends upwardly and outwardly and its inner end is concentric with the toothed plate 7 and is in close proximity to the crowns of the teeth 8, as shown in Figure 1.

A bracket 15 having an upwardly turned end is secured to the top of the motor 3 and extends therefrom. Such bracket carries an adjusting screw 16 extending therethrough and threaded into the plate 4. By adjusting screw 16 the plate 4 and housing 11 carried thereon can be bent or sprung inwardly or outwardly to a slight degree whereby the clearance between the teeth and the inner end of the tube 13 can be adjusted. Vegetables or fruit are fed into the device through the tube 13 by means of the feeding plunger 17, the handle 18 of which is held in the hand of the operator. The plunger is of slightly less diameter than the inside diameter of the tube 13 and is formed with a central slot 19 adapted to receive the web 14 in the tube when the plunger is inserted into the tube.

When operating my device the motor 3 is set in motion and a receptacle is placed beneath the orifice 12 in the bottom of the housing 11. Vegetables or fruit are fed through the tube 13 by means of the plunger 17 and are pressed against the rotating disc 7. The teeth 8 on the disc 7 shreds the food which drops downwardly through the orifice 12 into the receptacle. During such operation the web 14 in the feeding tube 13 acts to prevent the disc 7 from rotationg the food being shredded. Some of the shredded food will pass through orifices 28 formed in the plate 7 by the extruded teeth 8, but will drop from the rear of the plate 7 since no hindrance is offered due to the spider-like construction of the number 9.

In order to facilitate the removal of the shredding unit I provide a collar 20, which is secured on the motor shaft 6. The collar is formed with an orifice 21 adapted to receive a rod 22, the length of which is somewhat greater than the distance between the shaft 6 and the adjusting screw 16. When the rod 22 is in position and resting against the adjusting screw 16 as shown in Figure 3 it serves to lock the motor shaft against rotation so that the shredding unit may be unscrewed.

In order that the housing 11 may be removed for cleaning purposes, it is provided with two lugs 23 which carry studs 24 receivable into open ended slots 25 in lugs 26 which extend from the sides of the plate 4. Wing nuts 27 are threaded upon the studs to engage the rear faces of the lugs 26. As the spider arms 9 are spaced away from the back of the shredding disc 7, it can be thoroughly cleaned.

From the foregoing description it will be apparent that I have devised an efficient yet simple device for shredding vegetables and fruits, and although I have described a particular embodiment of my invention it is to be understood that I can make such changes and alterations as I may from time to time deem necessary without departing from the spirit of my invention as set forth in the appended claim.

What I claim as my invention is:

In a device of the character described, a vertical disc rotatable about a horizontal axis and against which vegetables or fruit are pressed to be shredded, shredding teeth carried by the disc, a housing in which the disc is contained and formed with an orifice in its bottom, an open ended feeding tube of substantially the same diameter as the disc protruding upwardly from the housing at an angle and having its inner face adjacent to and concentric with the toothed face of the disc and through which vegetables are fed to bear against the teeth, a dividing web in the tube to retain the material passing therethrough against rotation, a feeding plunger adapted to be manually moved inwardly through the feeding tube to press food against the shredding disc and having a slot therein in which the feeding tube web is received and whereby the plunger is retained against rotation in the tube, the inner face of the plunger being in a vertical plane when in the tube so that such face is parallel to the face of the vertical disc irrespective of the position of the plunger in the feeding tube.

JOSEPH MacRAE NEWMAN.

REFERENCES CITED

The following references are of record in the file of this patent:

UNITED STATES PATENTS

| Number | Name | Date |
|--------|------|------|
| 461,656 | Weishan, et al. | Oct. 20, 1891 |
| 1,772,706 | Campbell | Aug. 12, 1930 |
| 1,931,857 | Baccellieri | Oct. 24, 1933 |
| 1,983,666 | Hoe | Dec. 11, 1934 |